Figure 1:
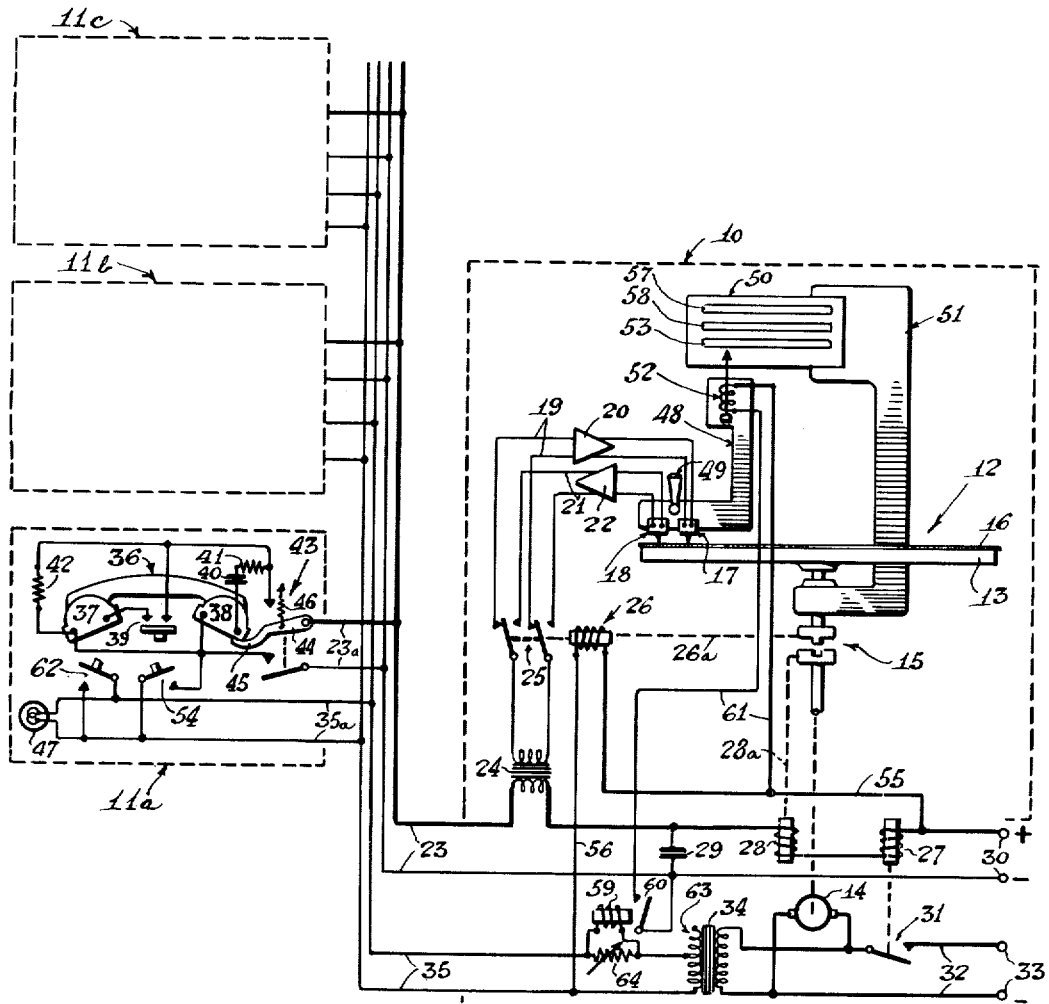

July 17, 1956 G. H. FRITZINGER 2,755,337
REMOTE CONTROL SYSTEMS FOR PHONOGRAPHS
Filed March 26, 1952 2 Sheets-Sheet 1

INVENTOR
George H. Fritzinger
BY Henry Lanahan

July 17, 1956  G. H. FRITZINGER  2,755,337
REMOTE CONTROL SYSTEMS FOR PHONOGRAPHS
Filed March 26, 1952  2 Sheets-Sheet 2

INVENTOR
George H Fritzinger
BY Henry Lanahan

United States Patent Office 2,755,337
Patented July 17, 1956

2,755,337

REMOTE CONTROL SYSTEMS FOR PHONOGRAPHS

George H. Fritzinger, West Orange, N. J., assignor to Thomas A. Edison, Incorporated, West Orange, N. J., a corporation of New Jersey Application March 26, 1952, Serial No. 278,703

13 Claims. (Cl. 179—6)

This invention relates to remote control systems for phonographs, especially those of the dictating-machine type. The invention is applicable particularly to remote control multistation dictation-recording systems of the character described and claimed in the pending Somers et al. application Serial No. 247,244, filed September 19, 1951, and having common ownership with the present application. The invention is herein described in connection with such dictation-recording system but without intending any unnecessary limitation thereto.

The dictation-recording system just referred to comprises a plurality of remote operators' stations connected in parallel with a single phonographic machine. The connection between each remote station and the phonographic machine comprises two circuits, one of which constitutes a combined communication and control circuit and the other a signaling circuit.

At least three separate basic control operations must necessarily be performed by the operator to use a dictation-recording system. These control operations are: (1) for activating the system for immediate start-stop operation, typically as by starting the drive motor, (2) for placing the machine into and out of operation for recording, and (3) for placing the machine into and out of operation for playback. These basic control operations are typically performed by manual switches. Two of these switches are utilized to establish lower and higher levels of direct current in the communication circuit to operate respective control relays, and the third is utilized to establish a circuit via one line of each of the communication and signaling circuits.

Additionally, each remote operator of a dictation-recording system should have facility for making indexing marks as for "length" and "corrections," to aid the transcriber in transcribing the recorded dictation. In the aforementioned Somers et al. application, "length" marks are made by the number one control switch as an incident of restoring the system to inactivated condition, and "correction" marks are made through concurrent operation of a pair of the control switches.

Objects and features of the present invention reside in making available new control operations to the remote operators through the medium of the signalling circuit. By these new control operations, further indexing such as for making "rush" and "confidential" marks and/or machine selection may be performed as is herein particularly described; but, alternatively, it will be understood that any of the control operations mentioned in the previous paragraphs may be performed through the signaling circuit by my invention with resultant simplification of other parts of the system. These new control operations according to my invention are performed by control of current in the signaling circuit with the use of permanent apparatus connected in the signaling circuit and without interfering with the signaling circuit or with its signaling function. The phrase "control of current in the signaling circuit" is herein employed broadly to comprehend controlling the level of signaling current and/or the character of current in the signaling circuit —i. e., whether A. C. or both A. C. and D. C. together.

These and other objects and features of my invention will be apparent from the following description and the appended claims.

Figure 3:
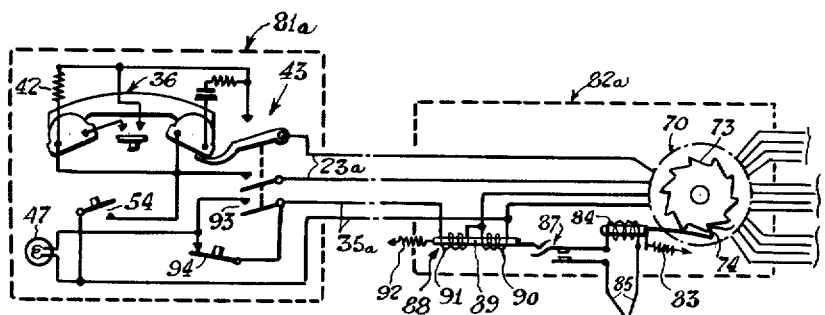
Figure 2:
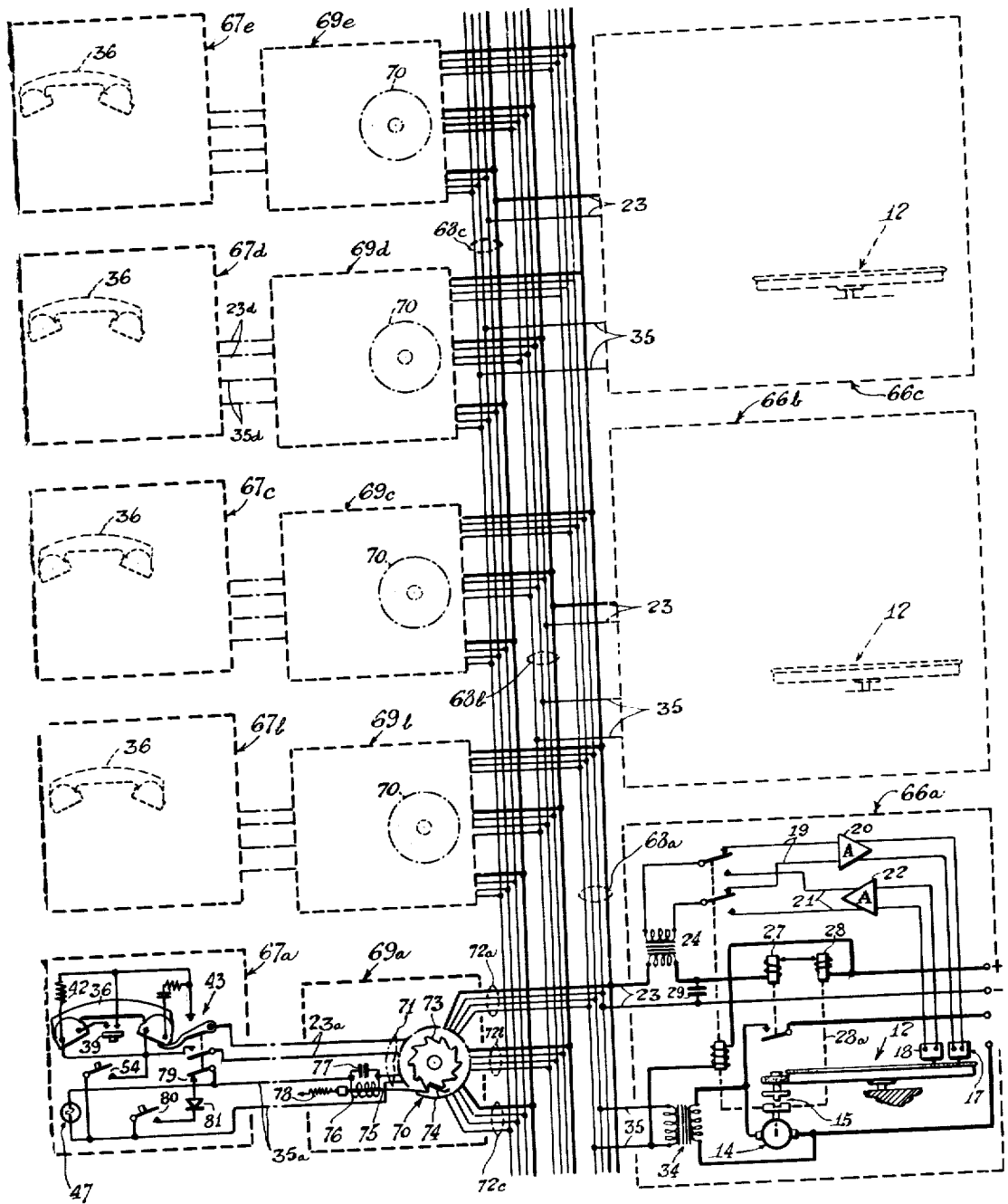

In the description of my invention reference is had to the accompanying drawings, of which:

Figure 1 is a schematic diagram of circuits and mechanism showing a remotely-controlled multistation dictation-recording system incorporating one form of my invention adapted for making indexing marks;

Figure 2 is a schematic diagram of circuits and mechanism showing a remotely-controlled dictation-recording system including a plurality of both operators' and attendants' stations and including further another form of my invention adapted for machine-selection purposes; and Figure 3 is a fractional schematic diagram of a portion of the circuits and apparatus shown in Figure 2 but modified to illustrate a third form of my invention for machine-selection purposes.

The phonographic system shown in Figure 1 can be used for recording or for playback at the will of the operator, and comprises an attendant's station 10 including a dictating machine 12 and control circuits and devices, and one or more identical remote operators' stations of which one, referred to as 11a, is shown in full and two others, referred to as 11b and 11c, are shown only diagrammatically. The dictating machine 12 (fractionally shown) comprises a turntable 13 driven by a motor 14 through a clutch 15. The turntable carries a record disc 16 engaged by a recording unit 17 and a reproducing unit 18. Audio speech-representing currents are fed to the recording unit through a circuit 19 serially including an amplifier 20, and such currents are fed from the reproducing unit 18 through a circuit 21 serially including an amplifier 22. Two amplifiers are herein shown only to simplify the description, it being understood that one amplifier with suitable switches may suffice for both recording and reproducing.

The dictating machine has a communication or audio circuit 23 which serially includes the primary of an audio transformer 24, the secondary of which is connectable either to the recording circuit 19 or reproducing circuit 21 by a double-pole double-throw switch 25 constituting part of a relay 26. The audio circuit is used also to control the machine, and for the latter purpose it includes two serially-connected relays 27 and 28. Audio currents in the audio circuit are by-passed around these relays by a condenser 29. The audio circuit is energized from a low-voltage D.-C. power source (not shown) which is connected to terminals 30 marked + and — respectively. The relays 27 and 28 are adapted to operate at different levels of direct current established selectively by the remote operator, as will appear. The relay 27 has contacts 31 operated at the lower current level to close a power circuit 32 serially including the motor 14. This power circuit is energized from an A.-C. source (not shown) which is connected to terminals 33. The second relay 28 is adapted to operate at the higher level of current and controls the clutch 15 as represented diagrammatically by the tie line 28a. These relays may of course perform still other control functions which need not however be herein described. For the present purposes it will be understood that the motor 14 is started when the relay 27 is operated and that the clutch 15 is engaged to start rotation of the turntable 13 when the relay 28 is operated. An energization of the communication circuit 23 at the lower current level, with a resultant starting of the motor 14 or other conditioning of the machine for immediate start-stop operation, is herein considered as an activation of the phonographic system.

In the power circuit 32 and in shunt with the motor 14 there is a voltage stepdown transformer 34 the secondary of which is connected to two outgoing leads constituting a signal circuit 35. This signal circuit is accordingly energized whenever the phonographic system is in activated condition.

The operators' stations 11a, 11b and 11c are identical, and a description of the station 11a will suffice for all three. The station 11a has a handpiece 36, for example, of the usual telephone variety including, as transducer elements, a carbon button microphone 37 and a receiver 38. The microphone 37 is connectable in a branch 23a of the audio circuit 23 through a manual switch 39 and a double-pole on-off station switch 43 having one pole in each line of the branch communication circuit. Both poles are closed with their associated contacts when the station switch is in "on" position and broken therefrom when in "off" position. The receiver unit 38 is connectable in this same branch communication circuit by closure of the station switch, but this connection is made through condenser 40 and resistor 41. Also, the station has a resistor 42 which is connected directly across the branch communication circuit 21a when the station switch is closed. The connection of the resistor 42 across the branch communication circuit causes direct current to flow in the main communication circuit 23 at the lower current level, as will appear.

At least one of the movable pole elements of this station switch, herein referred to as 44, is associated with a support for the handpiece 36; for example, this pole element may have a hook-shaped end portion 45 adapted to receive the handpiece and support it in idle position when the station is not in use. The pole elements of the station switch are urged upwardly into closed positions by a spring 46, but when the handpiece is placed on the support 45 the weight thereof is sufficient to overcome the spring and to hold the station switch open. In Figure 1, the handpiece is shown resting on its support to hold the station switch 43 open.

The station 11a has also a signal lamp 37 for producing a busy signal at that station whenever the phonograph system is in activated condition. This lamp 47 is in a branch signaling circuit 35a connected to the main signaling circuit 35 at the attendant's station.

The branch communication circuits of the remote stations are all connected to the audio circuit 23 in parallel relation to each other; likewise, the branch signaling circuits of the remote stations are all connected to the main signaling circuit 35 in parallel to each other. Preferably, each branch comprises two separate lines; accordingly, four lines lead out from each of the remote stations as shown.

The recorder and reproducer units 17 and 18 are mounted on a carriage 48 (diagrammatically shown) for traveling movement across the record disc 16. These units may be lifted from and lowered onto the record either individually or in unison as by a suitable mechanism operable by a lever 49 and not herein necessary to show for the purposes of the present invention. In remotely-controlled phonographic systems, both units are preferably normally engaged with the record and the reproducer is at a trailing distance behind the recorder since then mechanical shifting of the units to and from the record are unnecessary in listening back to an end portion of one's recorded dictation.

For indexing purposes, an index slip 50 is mounted on a stationary frame member 51, and a solenoidal-type marker 52 is mounted on the carriage 48 for traveling movement along the slip in correspondence with the movement of the recorder 17 across the record disc. The marker 52 registers with a zone 53 on the index slip. Typically several such markers are provided but only one need be shown for the purposes of the present invention, as will appear.

The lower current level in the audio circuit for activating the phonographic system is established via the resistor 42 when the station switch 43 is closed. Upon next closing the switch 39 the carbon button microphone 37 is connected in parallel with the resistor 42 to increase the current level to that at which the relay 28 is operated to engage the clutch 15. The station switch 43 is therefore an on-off control for the phonographic system and the switch 39 is a start-stop control for the machine. A third switch 54 at the remote station 11a is a playback control for the machine, and is connected between the negative side of the branch communication circuit 23a and one side of the branch signaling circuit 35a. When this switch is closed an energizing circuit for the relay 26 is completed across the D.-C. source 30 through a line 55 leading from the positive terminal of this source to the relay 26, a line 56 leading from the relay to the signaling circuit 35, one side of the signaling circuit 35 and the corresponding side of the branch signaling circuit 35a, switch 54, one pole of station switch 43 and the negative side of the branch communication circuit 23a and of the audio circuit 23 to the negative terminal of the source 30. Energization of the relay 26 operates switch 25 to connect the audio circuit 23 to the reproducer 18 and to close the clutch 15 via the tie line 26a. Thus the machine is put into operation for playback as the switch 54 is closed.

Indexing, as for making "length" and "correction" marks, may also be performed by means of the controls 39, 43 and 54 as is described in the Somers et al. application above-mentioned. Such length and correction marks are typically made in the two upper zones 57 and 58 of the index slip 50 by respective markers not shown. Although it is unnecessary herein to describe the apparatus by which the length and correction marks are made, it is important to note that it is highly desirable to circumvent the need for performing still additional control functions by means of the main control switches 39, 43 and 54 in order to avoid circuit complications. Still further control operations are however desirably made available to the operators, especially when the machine is remotely controlled. By way of example, one such additional control operation is indexing for indicating when recorded matter is to be rushed—i. e., transcribed immediately—and/or kept confidential. By the present invention, such additional control operation may be performed via the signaling circuit without complication of apparatus.

The marker 52 may be utilized to effect such "rush-confidential" marks in zone 53 of the index slip 50. For controlling this marker, there is a relay 59 connected permanently in the main signaling circuit 35, which has normally-open switch contacts 60 in an energizing circuit 61 of the marker 52 connected across the D.-C. source 30. The relay 59 is normally not operated—i. e., not operable by normal signaling current passing to the several remote stations. For example, a typical voltage supplied to each of the branch signaling circuits may be fourteen volts, and a typical voltage drop across the relay 59 may be seven volts, the transformer 34 being therefore adapted to supply normally twenty-one volts to the main signaling circuit 35. The relay 59 will not operate at seven volts but may typically require about fifteen volts for operation. For stepping up the voltage to operate this relay at the will of the remote operator, each remote station is supplied with a manual shorting switch 62 connected across the respective branch signaling circuit. Closure of this switch will cause the full line voltage—i. e., twenty-one volts in the specific instance—to be applied across the relay 59 to assure its operation. By this operation the relay contacts 60 are closed to cause the marker 52 to be operated to make the "rush-confidential" mark. Thus each operation of switch 62 will cause such mark to be made. To accommodate different line voltages to which the terminals 33 are connected, and to accommodate also different load conditions in the signaling circuit caused by different numbers of remote stations connected in the phonographic system, the secondary of the transformer 34 may be tapped as indicated at 63 and the relay 59 may be shunted by an adjustable resistor 64.

In Figure 2 a modified form of my invention is illustrated in connection with a remotely-controlled phonographic system of the type above described but for the different purpose of effecting machine selection. Here, the phonographic system has not only a plurality of remote stations but also a plurality of attendants' stations each provided with a dictating machine. By way of example, three attendants' stations are shown represented by the characters 66a, 66b and 66c, and five remote stations are shown represented by the characters 67a, 67b, 67c, 67d and 67e. As will appear, by means of the present embodiment of my invention, if a remote station is connected to a machine already activated for use from another remote station, the operator at that station may by a simple manipulation shift the connection of his station to a succeeding machine without disabling the operation of the machine in use, and if that next machine is already also activated, he may through a second manipulation make connection to the next-succeeding machine, and so on, until connection is made to an idle machine. The ability to make these successive connections without disturbing operation of the machines already in use is made possible by performing the controlling function via the signaling circuits. Also, as in the previous embodiment, the controlling apparatus is connected permanently to the signaling circuit and the signaling function itself is undisturbed.

The attendants' and remote operators' stations may be respectively identical, and so circuits and mechanism are shown only for one of each. Insofar as the prior art is concerned, analogous components of these stations may be the same as in the previous embodiment, and are therefore given the same reference numbers.

The main audio circuit 23 and main signaling circuit 35 of each attendant's station are connected to a 4-wire bus designated by the number 68 with the suffix letter of the respective attendant's station. Thus, there are the conductor groups 68a, 68b and 68c. Leading from each remote operator's station are the branch communication and branch signaling circuits 23 and 35 with the suffix letters of the respective stations. The branch communication and signaling circuits of each remote station are connected to a stepping switch mechanism designated by the number 69 with the suffix letter of the respective remote station. Each of these stepping switch mechanisms is identical and so only one, the switch mechanism 69a, is shown in full. This switch mechanism comprises a drum-type stepping switch 70, diagrammatically shown, which may be of usual construction having four input leads 71 and having a four-line set of output leads for each attendant's station, say ten in all of which only three are shown by way of illustration, which output-line sets are connected to the conductor groups 68a, 68b and 68c respectively and are designated by the number 72 with the suffix letter of the respective conductor group. The drum-type stepping switch is to be advanced by successive steps of one-tenth revolution each to connect the respective remote station to the phonographic machines in succession. Such step advance may be effected by a ratchet 73 and a stepping pawl 74 connected to an armature 75 of a solenoid 76 shunted by a condenser 77. The armature is urged by a tension spring 78 to hold the pawl normally in operated position. The solenoid 76 is connected serially in the branch signaling circuit 35a of the respective remote station 11a, but is of a character operable only by direct current. To this purpose and for the benefit of providing a low A.-C. impedance across the solenoid for the signaling current, the condenser 77 is connected across the solenoid. Thus, the normal alternating signaling current has no influence on the solenoid and the pawl is held normally in operated position, as shown.

At each remote station, there is a means operable while the respective station switch is in "off" position for connecting a rectifier across the signaling circuit. For instance, at the remote station 11a, there is a line connection across the branch signaling circuit comprising in series a switch 79 tied to the station switch so that it will be closed when the station switch is in "off" position, a normally-open manual selector switch 80 and a rectifier 81. If the manual switch 80 is closed while the station switch is in "off" position, the rectifier is connected across the branch signaling circuit. If the selector switch is closed when the branch signaling circuit is energized— i. e., when the respective remote station is connected to a machine already activated for use—pulsating direct current is produced in the branch signaling circuit which will operate the solenoid 76 to cock the pawl 74—i. e., move it against the force of the biasing spring 78 into unoperated position wherein it engages the next-succeeding tooth of the ratchet 73. Upon next releasing the selector switch 80, the stepping switch is propelled ahead one step by the biasing spring 78 to connect the remote station 11a to the next-succeeding machine. Note that closure of the selector switch 80 does not operate the stepping switch mechanism but merely prepares it for operation when the selector switch is next released; this is done so that power will be available to effect a complete step advance of the stepping switch notwithstanding that electric power to the branch signaling circuit 35a will be cut off during such advance as when connection is made to an idle machine. If the signal lamp again lights as the selector switch 80 is released, the operator will know that the next-succeeding machine to which his station has been connected is also in use. He may then press and release the selector switch again to connect his station to the next-succeeding machine. Whenever his signal lamp goes out upon releave of his selector switch, he will know that connection has been made to an idle machine. Upon then picking up his handpiece he will activate that machine for his own use, which fact will be indicated by the lighting of his signal lamp.

If the remote operator could step his selector switch ahead while his station switch is in "on" position, his signal lamp would light after each release of the selector switch, either because of connection to a machine already in use or because of his activation of an idle machine as conneciton is made thereto. As a result, the remote operator would not know when he had obtained an idle machine. In order that his signal lamp will serve to inform him when connection is made to an idle machine, the switch 79 is provided to permit the stepping switch to be operated only while the station switch is in "off" position.

In Figure 3 there is a fractional showing of the system of Figure 2 modified according to another form of my invention. Insofar as the prior art is concerned, the remote station 81a is the same as each remote station of the previous embodiments and the components thereof are given the same reference numbers. The stepping-switch mechanism 82a may comprise the same stepping switch 79, ratchet 73 and pawl 74 as in the previous embodiment, but the operating mechanism thereof is modified according to the present embodiment of my invention.

The pawl 74 is herein biased into unoperated position by a spring 83 and is operated by a solenoid 84. In order that this solenoid may have ample operating power, it is provided with an energizing circuit 85 adapted to be connected to a suitable A. C. power source by way of a plug 86. The circuit 85 is controlled by a switch 87 operable by a solenoid 88 connected in a respective branch signaling circuit 35a.

The solenoid 88 has an armature 89 for operating the switch 87, and has two coils 90 and 91 for operating the armature 89. The armature 89 is biased by a spring 92 to hold the switch 87 normally open. The coil 90 is operative to move the armature 89 against the spring 92 to close the switch 87. The coil 91 is poled so as to oppose the coil 90 so that the two coils have no effect on the armature when both are energized. The coil 90 is connected across the branch signaling circuit 35a for energization whenever the branch signaling circuit is connected to an activated machine. The coil 91 is connected serially in the branch signaling circuit 35a and is also normally energized whenever this branch circuit is connected to an activated machine, but the energizing current for this coil is that which lights the signal lamp 47 of a remote station. At the remote station 81a there is a switch 93 in the signaling circuit tied to the station switch 43 so that it will be held open when the station switch is in "off" position. This switch 93 is shunted however by a normally-closed manual selector switch 94 to cause the signaling circuit to be normally closed. Thus, both solenoid coils 90 and 91 are normally energized when the remote station is connected to an activated machine.

If, while the remote station is connected to an activated machine and while the station switch is in "off" position, the remote operator should press the selector switch 94, the solenoid coil 91 will be deenergized to cause the solenoid coil to propel the armature 89 to the right, against the force of the biasing spring 92, to close the switch 87. This closure will cause energizing current to be supplied to the solenoid 84 to advance the stepping switch by one step. If, by such advance, connection is made to another machine in activated condition, the coil 90 will remain energized, and as soon as the selector switch is released the signal lamp will be lit to indicate that fact. Also, as the selector switch is released, the solenoid coil 91 is again energized to oppose the coil 90 and cause the switch 87 to be opened by the biasing spring 92. This will cause the solenoid 84 to be deenergized, wherefore the pawl 74 will be cocked by the spring 83 for subsequent operation. If the selector switch 94 is again pressed and released, the stepping switch will be advanced another step to connect the station to a next-succeeding machine. If connection is made to an idle machine, the coil 90 becomes deenergized as that connection is made; this allows the switch 83 to be opened by the spring 92, but this opening does not occur until the armature 89 reaches the end portion of its return travel so as to assure that the solenoid 84 will be energized sufficiently to complete a full advance of the stepping switch by one step. Upon releasing the selector switch 94 when connection has been made to an idle machine, the switch 87 is held open by the spring 92, and the signal lamp remains off to indicate that an idle machine has been selected. When the handpiece 36 is next picked up, the station switch 43 is moved to "on" position to activate the selected phonographic machine, and the signal light now comes on but the switch 87 remains in open position because the solenoid coils now nullify each other.

The broad feature of my invention of effecting remote control operations in remotely-controlled phonographic systems of the character described, through change of current in the signaling circuit and with the use of permanent control apparatus in that circuit responsive to such change of current, has been illustrated in terms of three specific embodiments wherein in Figure 1 the change is one of increasing the current level, in Figure 2 it is one of modifying the character of the current, and in Figure 3 it is one of reducing the current level. My invention is not limited however to this broader feature thereof, but resides further in details of the specific embodiments described. It is intended to cover all changes and modifications of the embodiments herein described for purposes of disclosure which do not constitute departures from the spirit and scope of the invention set forth in the following claims.

I claim:

1. In a remotely-controlled phonographic system comprising an attendant's station provided with a source of A.-C. potential and with a phonographic machine having an audio circuit, and a remote operator's station provided with a signaling device: the combination of a signaling circuit connecting said remote station to said A.-C. source of potential and serially including said signaling device; an electrically-energizable control device for said phonographic system connected permanently in said signaling circuit and inoperable by normal signaling current; and control means at said remote station comprising a manually-operable switch connected to said signaling circuit for changing the current therein to cause operation of said control device.

2. The combination set forth in claim 1 wherein said control device is adapted for operation only by direct current, including a condenser shunting said control device for by-passing alternating signaling current in said signaling circuit, and wherein said last-stated control means comprises a rectifier connectable in parallel with said signaling device by said manually-operable switch for producing a component of direct current in said signaling circuit effective to cause operation of said control device.

3. The combination set forth in claim 1 wherein said control device comprises a coil connected serially in said signaling circuit and adapted to cause operation of said control device only when an abnormally-high level of alternating current is produced in said signaling circuit, and including means connecting said manual control switch across said signaling circuit for shorting the signaling circuit at said remote station to produce said abnormally-high current.

4. The combination set forth in claim 1 wherein said control device comprises a solenoid having an armature biased into unoperated position, two coils opposing one another one of which is connected permanently across said signaling circuit and effective to operate said armature against its biasing force and the other of which is connected in series in said signaling circuit and effective when energized by normal signaling current to nullify the action of said first coil on said armature, and wherein said manually-operable switch is in series in said signaling circiut and operable at will to open the circuit through said second coil whereby to cause said first coil to operate said armature.

5. In a remotely-controlled dictation-recording system comprising an attendant's station provided with an A.-C. source of potential and with a recording machine having an audio circuit, a movable support for a record, a record-cooperating recording device, means for effecting relative traveling movement between said record support and recording device, and indexing means for making indexing marks according to the relative positioning of said support and recording device: the combination of a remote operator's station provided with a transducer, an on-off station switch for said machine and a signaling device; a communication circuit for connecting said remote station to the audio circuit of said machine and serially including said transducer and station switch; a signaling circuit for connecting said signaling device; means connected to said communication circuit and operable on closure of said station switch for activating said phonographic machine for use and for connecting said signaling circuit to said A.-C. source of potential; electrically-energizable means connected in said signaling circuit and effective upon establishment of a predetermined abnormal value of current in said circuit for operating said indexing means; and means including a manually-operable switch at said remote station connected to said signaling circuit for establishing said predetermined current value.

6. The combination set forth in claim 5 wherein said indexing means comprises an index slip having a zone extending along the length thereof for receiving "rush-confidential" marks, and a solenoid for making said marks, and wherein said electrically-energizable means comprises a relay controlling said solenoid and operable by current in said signaling circuit when said manual switch is closed.

7. In a remotely-controlled multistation phonographic system comprising a plurality of attendant's stations provided respectively with a source of potential and with a phonographic machine having audio and signaling circuits, and a plurality of remote operators' stations each including a transducer, an on-off station switch and a signaling device: the combination of a branch communication circuit and a branch signaling circuit leading from each of said remote stations, each branch communication circuit including the respective station switch and transducer in series and each signaling circuit including the respective signaling device; a dual-circuit stepping switch for each of said remote stations each operable for connecting the branch communication and branch signaling circuits of the respective remote station to the audio and signaling circuits of said phonographic machines in succession; means in the audio circuit of each of said machines, operable on closure of one of said station switches when the respective branch communication circuit is connected to said audio circuit, for activating the phonographic machine for use and for connecting said signaling circuit to said source of potential whereby to cause energization of the branch signaling circuit of each remote station connected to said activated machine; actuating means for each of said stepping switches comprising electrically-operable means connected permanently in the respective branch signaing circuit and effective upon a predetermined change of current from normal value in said branch signaling circuit to condition said actuating means for operation, and further comprising means effective on restoration of the signaling current in the branch signaling circuit to normal value for advancing the stepping switch by one step; and means at each remote station operable upon the remote station being connected to an activated one of said phonographic machines for producing said current change in the respective branch signaling circuit whereby to advance said stepping switch to connect the respective remote station to a successive one of said phonographic machines.

8. The combination set forth in claim 7 wherein each of said actuating means comprises reciprocative means for successively advancing said stepping switch, constantly-effective means urging said reciprocative means in its direction of operation, and a solenoid connected in the respective branch signaling circuit and responsive to said current change for conditioning said actuating means for subsequent operation by said constantly-effective means when the current in the branch signaling circuit is returned to normal.

9. The combination set forth in claim 7 wherein said potential source is one of alternating current, and each of said switch-actuating means comprises a coil connected permanently in the branch signaling circuit ineffective when energized by alternating signaling current to condition said actuating means for operation, and wherein each of said current-changing means comprises a rectifier and a manual switch closable to connect the rectifier across the branch signaling circuit to cause a component of direct current to be produced for activating said coil.

10. The combination set forth in claim 7 wherein each of said switch-actuating means comprises reciprocative means for recurrently advancing said stepping switch, means biasing said reciprocative means into operated position, a pair of solenoid coils operating on said reciprocative means in opposed relation one of which is connected permanently across the respective branch signaling circuit and effective to move the reciprocative means into initial position against the action of said biasing means and the other of which is effective when subsequently energized by normal signaling current in the branch signaling circuit to nullify the action of said one coil whereby to cause movement of said reciprocative means through its operating stroke by said biasing means to effect a step advance of said stepping switch, and wherein said last-stated means at each of said remote stations comprises a switch serially connected in the respective branch signaling circuit operable to deenergize said other coil at will.

11. The combination set forth in claim 7 including means at each of said remote stations operable by the respective station switch for disabling the respective current-changing means while the station switch is closed.

12. The combination set forth in claim 9 including means at each remote station operable by the respective station switch for rendering the respective manual switch ineffective to connect said rectifier across the respective branch signaling circuit while the station switch is closed.

13. In a remotely-controlled phonographic system comprising an attendant's station provided with a phonographic machine having an audio circuit; a plurality of remote operators' stations each provided with a transducer, a station switch and a signaling device; and respective communication circuits for connecting the transducers of said remote stations in parallel to said audio circuit of said machine when the station switches are closed: the combination of respective signaling circuits for connecting said signaling devices in parallel to said attendant's station; means responsive to closure of any one of said station switches for supplying energizing current to all of said signaling circuits whereby all of said signaling devices are operative whenever a transducer of one of said remote stations is connected to said audio circuit; an electrically-energizable control device for said system connected in common with said signaling circuits and inoperable by normal signalling current; control means at each of said remote stations connected to the respective signaling circuit and operable while the signaling circuit is energized for changing the current therein to cause operation of said control device; and means at each of said remote stations controlled by the respective station switch for disabling the respective control means while the station switch is in closed position.

References Cited in the file of this patent

UNITED STATES PATENTS

| 1,993,870 | Belliveau | Mar. 12, 1935 |
| 2,066,672 | De Berard et al. | Jan. 5, 1937 |
| 2,277,207 | Chenoweth et al. | Mar. 24, 1942 |
| 2,391,897 | Harrington | Jan. 1, 1946 |

UNITED STATES PATENT OFFICE
CERTIFICATE OF CORRECTION

Patent No. 2,755,337                                  July 17, 1956

George H. Fritzinger

It is hereby certified that error appears in the printed specification of the above numbered patent requiring correction and that the said Letters Patent should read as corrected below.

Column 3, line 42, for the numeral "37" read -- 47 --.

Signed and sealed this 4th day of April 1961.

(SEAL)
Attest:    ERNEST W. SWIDER

Attesting Officer                              ARTHUR W. CROCKER
                                                            Acting Commissioner of Patents